United States Patent [19]
Endoh et al.

[11] Patent Number: 5,822,631
[45] Date of Patent: Oct. 13, 1998

[54] FORCED-DRIVING APPARATUS FOR FILM REWINDING MOTOR OF A CAMERA

[75] Inventors: Yasuhiko Endoh; Masahiro Hayakawa, both of Tokyo, Japan

[73] Assignee: Asahi Kogaku Kogyo Kabushiki Kaisha, Tokyo, Japan

[21] Appl. No.: 787,134

[22] Filed: Jan. 22, 1997

[30] Foreign Application Priority Data

Feb. 5, 1996 [JP] Japan .................................... 8-019150

[51] Int. Cl.$^6$ .............................. G03B 3/00; G03B 17/02
[52] U.S. Cl. .......................... 396/301; 396/278; 396/539
[58] Field of Search ................................... 396/277, 278, 396/301, 303, 387, 405, 406, 418, 539

[56] References Cited

U.S. PATENT DOCUMENTS

| | | | |
|---|---|---|---|
| 4,091,395 | 5/1978 | Kozuki et al. | 396/387 |
| 4,194,824 | 3/1980 | Arai et al. | 396/388 |
| 4,429,975 | 2/1984 | Shiozawa et al. | 396/301 |
| 5,630,193 | 5/1997 | Miyake et al. | 396/301 |

Primary Examiner—Safet Metjahic
Assistant Examiner—Nicholas J. Tuccillo
Attorney, Agent, or Firm—Greenblum & Bernstein, P.L.C.

[57] ABSTRACT

A forced-driving apparatus for a film rewinding motor of a camera which is adapted to rewind a film into a film cartridge includes supplemental power supply terminals which can be connected from the outside to supply power to rotate the film rewinding motor in a film rewinding direction.

6 Claims, 4 Drawing Sheets

FORCED-DRIVING APPARATUS FOR FILM REWINDING MOTOR OF A CAMERA

BACKGROUND OF THE INVENTION

1. Field of the Invention

The present invention relates to a camera having a film rewinding motor which is adapted to rewind a film into a film cartridge (patrone).

2. Description of the Related Art

In a camera having a film rewinding motor which is adapted to rewind a film into a film cartridge, if the film rewinding motor cannot be driven or controlled due to, for example, trouble with an internal control circuit, it is difficult to remove a film whose frames have not been completely exposed.

If this (situation) occurs, the film cartridge from which the portion of the film that has been exposed (photographed) can be unloaded from the camera in a darkroom and the exposed film portion manually rewound into the film cartridge. However, it is difficult for an operator to manually rewind the exposed film portion into the film cartridge in a darkroom. In a pre-winding type of camera in which the unexposed film is first unwound from the film cartridge and wound around a film winding spool, the unwound film is successively rewound into the film cartridge every time a frame of the film is exposed, if the rewinding motor cannot be driven or controlled due to trouble with the control circuit, etc., an attempt to unload the film from the camera in the manner of normal film unloading causes the last exposed frame of the film and the unexposed film that has not been rewound into the film cartridge, to be exposed. Namely, an exposure of the film that is not rewound into the film cartridge occurs, thus resulting in a waste of the film.

SUMMARY OF THE INVENTION

It is an object of the present invention to provide a forced-driving apparatus for rewinding a motor of a camera in which if the motor cannot be driven or controlled, for example, due to an inoperative control circuit of the motor and not the motor itself. The film can be easily unloaded from the camera without being exposed.

To achieve the object mentioned above, according to an aspect of the present invention, there is provided a forced-driving apparatus for a film rewinding motor of a camera which is adapted to rewind a film into a film cartridge. A a battery compartment has electrodes which can be connected to a battery for the camera. Supplemental power supply terminals (external power supply terminals) which are provided separate from the electrodes can be connected to an external power source to supply power to rotate the film motor in a film rewinding direction.

According to another aspect of the present invention, there is provided a forced-driving apparatus for a film rewinding motor of a camera having a motor for rewinding a film into a film cartridge. A battery supplies power to the motor through a control circuit of the motor. Supplemental power supply terminals connect directly to the motor without passing through the control circuit and can be connected to an external power source from the outside of the camera to supply power to the motor.

The supplemental power supply terminals can be provided, for example, in a battery compartment which can receive therein a battery for the camera.

The supplemental power supply terminals are preferably located at positions in which the supplemental power supply terminals cannot be connected from the outside when the battery is loaded in the battery compartment and can be connected from the outside when the battery is removed from the battery compartment.

The present disclosure relates to subject matter contained in Japanese patent application No. 8-19150 (filed on Feb. 5, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 4:
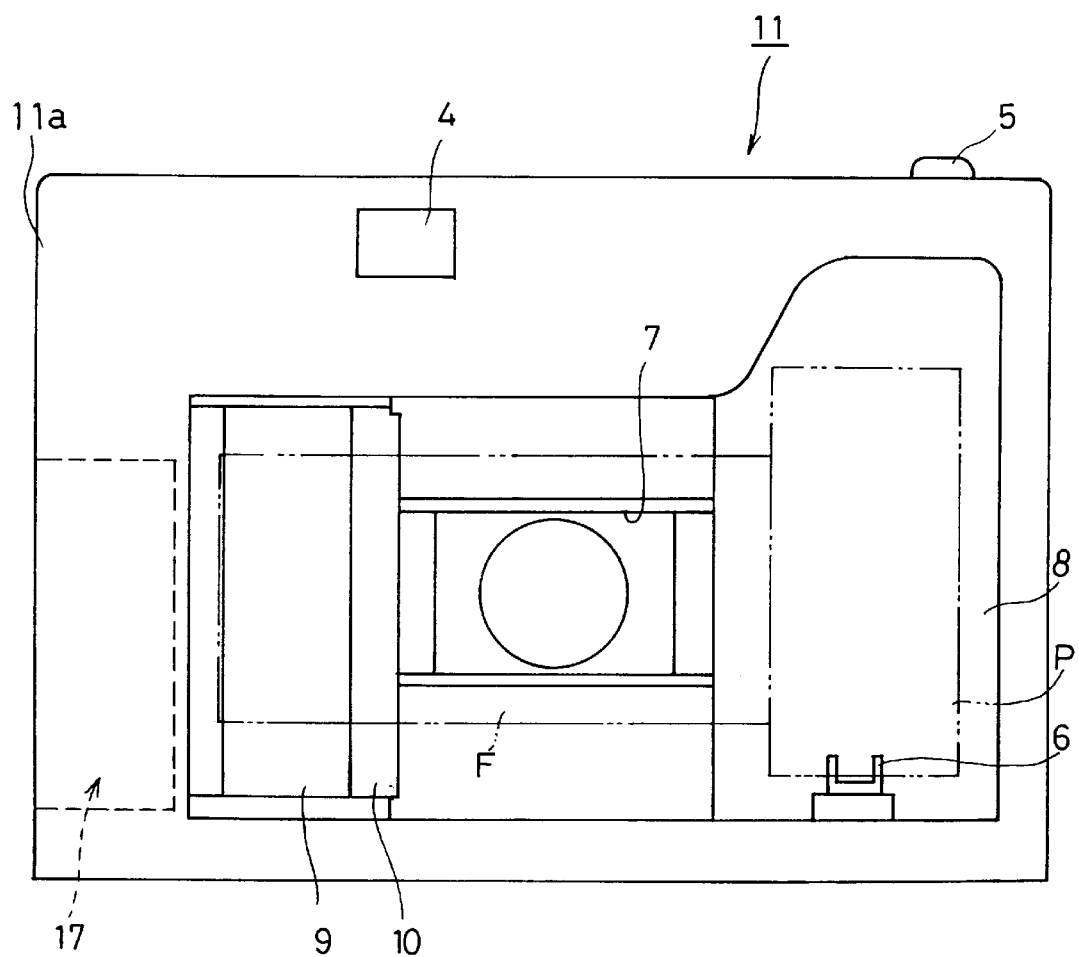
FIG. 4 is a back view of a camera having a forced-driving apparatus for a rewinding motor according to the present invention; and, FIG. 5 is a partially sectioned front elevational view of main components of a forced-driving apparatus for a rewinding motor of a camera according to another embodiment of the present invention.

FIG. 4 shows an internal structure of a camera body when a rear cover (not shown) is open. As can be seen in FIG. 4, a camera 11 has a camera body 11*a* which is provided with an aperture 7, a cartridge compartment 8 in which a film cartridge (patrone) P is received on one side of the aperture 7, and a spool compartment 10 on the other side of the aperture 7, in which a film winding spool 9 is provided to wind a film F discharged from the cartridge P. A rewinding fork 6 is provided in the cartridge compartment 8 to rotate a spool (not shown) provided in the cartridge P in a film rewinding direction.

A finder eyepiece opening 4 is provided on an upper portion of the rear surface of the camera body 11*a*. A release button 5 is provided on the right side of the top surface of the camera body 11*a*, as viewed in FIG. 4.

Figure 1:
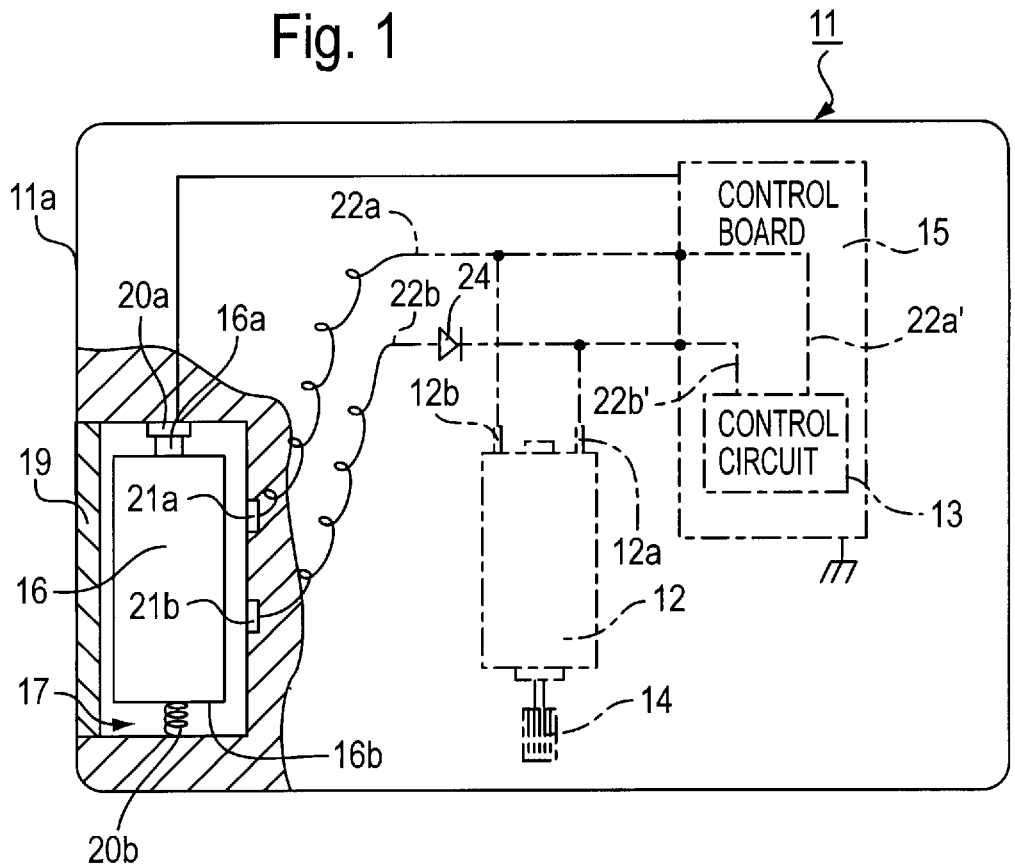
FIG. 1 is a partially sectioned front elevational view of main components of a forced-driving apparatus for a rewinding motor of a camera according to an embodiment of the present invention.

The camera body 11*a* also includes a motor 12. and a control board 15 having a control circuit (power supply circuit) 13 to control the motor 12, as shown in FIG. 1. A winding gear train (not shown) and a planetary gear train (not shown) are provided between a pinion 14 secured to a drive shaft of the motor 12, and the winding spool 9. Also, a rewinding gear train (not shown) and the planetary gear train are provided between the pinion 14 and the rewinding fork 6. With this arrangement, when the motor 12 rotates in the forward or reverse direction, the planet wheels (gears) of the planetary gear train rotate in the winding direction or rewinding direction to rotate the winding spool 9 or the rewinding fork 6. Such functions of the planetary gear train and the gear train are well known in the field. In the illustrated embodiment, the motor 12 serves as a film winding and rewinding motor. Note that FIG. 1 shows the internal components of the camera body 11*a* which are not shown in FIG. 4.

The camera body 11*a* is provided in the left end (as viewed in FIG. 1) portion thereof with a battery compartment 17 which receives therein a battery (power source) 16 and a cover 19 which opens or closes the opening of the battery compartment 17. One end 19a of the cover 19 is pivoted to the camera body 11a, and another end (hook) 19b of the cover 19 is engaged by an engaging portion (stepped portion) 17a formed in the battery compartment 17, as may be seen in FIG. 2. The cover 19 is made of synthetic resin and is elastically deformable or flexible so that the hook 19b can engage with and disengage from the stepped portion 17a. A positive terminal 20a, which can be connected to a positive electrode 16a of the battery 16, and a negative terminal 20b, which can be connected to a negative electrode 16b of the battery 16, are provided at upper and lower portions of the battery compartment 17, respectively.

Figure 2:
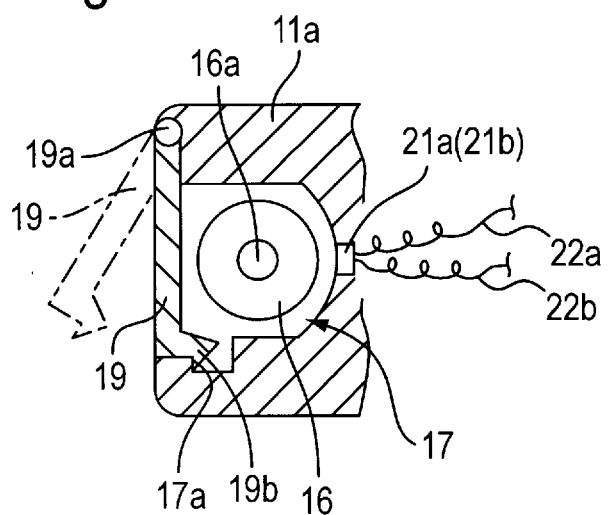
FIG. 2 is a sectional plan view of a main part of the forced-driving apparatus shown in FIG. 1.

As can be seen from FIGS. 1 and 2, the battery compartment 17 is provided therein with supplemental (external) power supply terminals 21a and 21b which are located at positions in which no connection to an supplemental (external) power supply can be established when the battery 16 is received in the battery compartment 17. The supplemental power supply terminals 21a and 21b can be connected to the outside when the battery 16 is removed from the battery compartment 17. Namely, the supplemental power supply terminals 21a and 21b are located at positions which are not exposed to the outside when the battery 16 is received in the battery compartment 17, even if the cover 19 is open. The supplemental power supply terminals 21a and 21b are directly connected to the motor 12 through connection lines (conductors) 22a and 22b without passing through the control circuit 13. Namely, the conductors 22a and 22b are connected to positive (+) and negative (−) terminals 12a and 12b of the motor 12 at intermediate portions of the conductors between the supplemental power supply terminals 21a and 21b and the control circuit 13, respectively. The portions of the conductors 22a and 22b on the control board 15 are formed by printed circuit patterns 22a' and 22b' formed on the control board 15.

Figure 3:
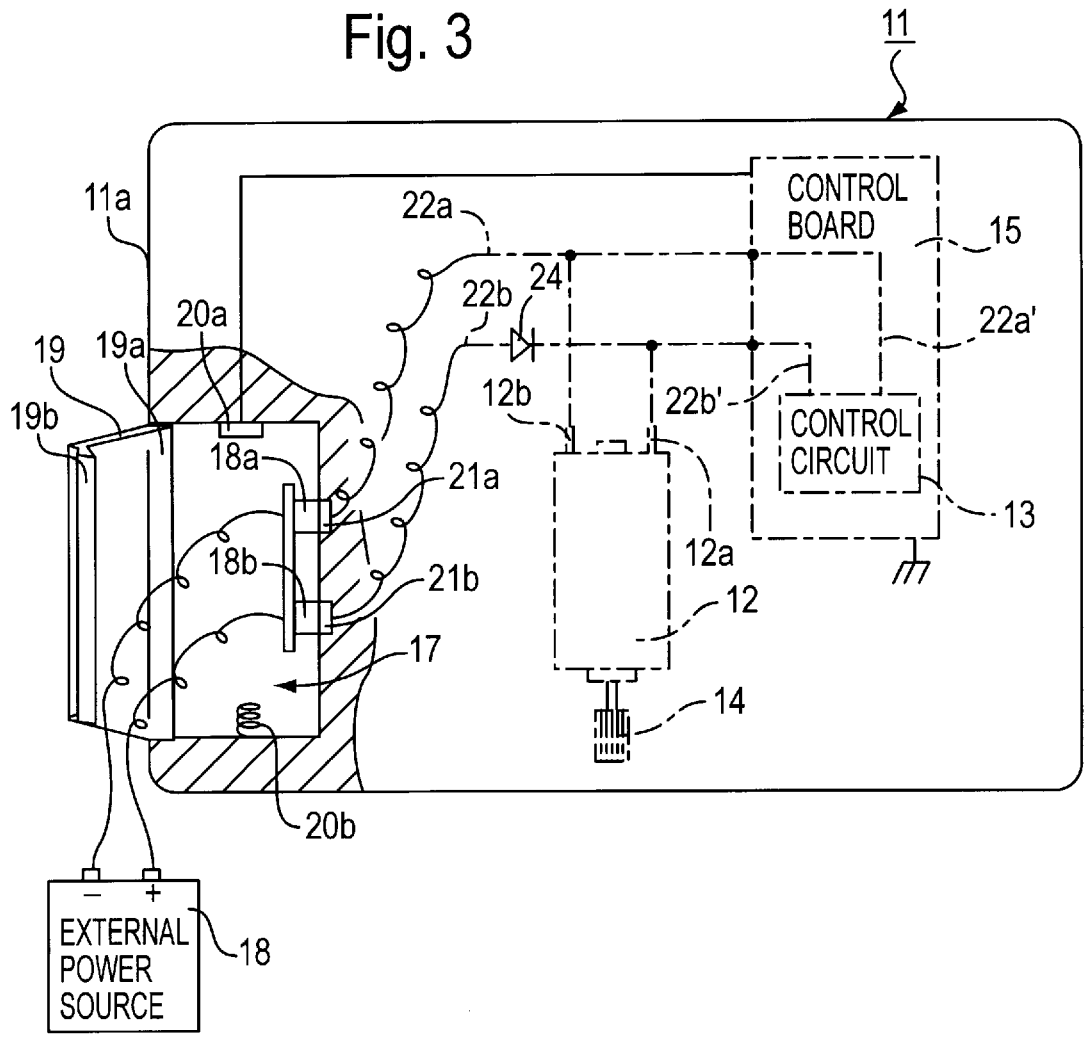
FIG. 3 is a partially sectioned front elevational view of main components of a forced-driving apparatus for a rewinding motor of a camera according to the present invention, shown in a position different from FIG. 1.

Thus, when the battery 16 is removed from the battery compartment 17, and the supplemental power supply terminals 21a and 21b are connected to respective power supply terminals 18a and 18b of an external power source 18 (FIG. 3), it is possible to forcedly rotate the motor 12 in the film rewinding direction (reverse direction), independently of the control circuit 13.

An operation of the forced-driving apparatus for a rewinding motor of a camera constructed as above will now be discussed.

The rear cover (not shown) is opened and the film cartridge P is loaded into the cartridge compartment 8. Thereafter, the leading end of the film F is withdrawn from the cartridge P onto the winding spool 9. When the rear cover is closed, a detection switch (not shown) is turned ON, so that power is supplied to the motor 12 from the battery 16 through the control circuit 13 on the control board 15. Consequently, the motor 12 is rotated in the forward direction (film winding direction). As a result, the film winding spool 9 is rotated in the film winding direction by a predetermined number of turns, so that an unexposed frame of the film F is moved to a photographing position opposed to the aperture 7.

In this state, when the release button 5 is depressed, a shutter mechanism (not shown) operates to expose the unexposed frame of the film F located at the aperture 7. The motor 12 is rotated again in the forward direction in accordance with the power supply to rotate the winding spool 9 in the film winding direction by one frame under the control of the control circuit 13. Thus, a second unexposed frame of the film F is moved to the photographing position at the aperture 7. The above-mentioned film winding operation is carried out every time each frame of the film is exposed.

Upon completion of the exposure of all the frames of the film F (or when a forced-rewinding switch (not shown) is turned ON), the power is supplied from the control circuit 13 to the motor 12, so that the motor 12 is rotated in the reverse direction to switch the planetary gear train. Consequently, the rewinding fork 6 is rotated in the film rewinding direction. As a result, the film F is rewound into the film cartridge P by the rewinding fork 6.

If the motor 12 will not operate due to the control circuit 13 being defective, etc., and not due to a defect of the motor 12 itself, during the rewinding operation of the film F, the film F is removed from the camera 11 as follows.

The hook 19b is disengaged from the stepped portion 17a to open the battery compartment 17. The battery 16 is then removed from the battery compartment 17. Thereafter, the power supply terminals 18a and 18b connected to the negative (−) and positive (+) terminals of the external power source 18 are connected to the supplemental power supply terminals 21a and 21b which are now exposed to the outside, so that power is directly supplied to the positive and negative terminals 12a and 12b of the motor 12 through the conductors 22a and 22b, without passing through the control circuit 13. Consequently, the motor 12 is rotated in the film rewinding direction, so that the rewinding fork 6 is rotated in the film rewinding direction through the pinion 14, the planetary gear train and the rewinding gear train. Hence, the exposed frame portion of the film F wound on the winding spool 9 is rewound into the film cartridge P. When the rewinding of the film F is complete, the rear cover (not shown) is opened, so that the film cartridge P can be removed from the camera.

Figure 5:
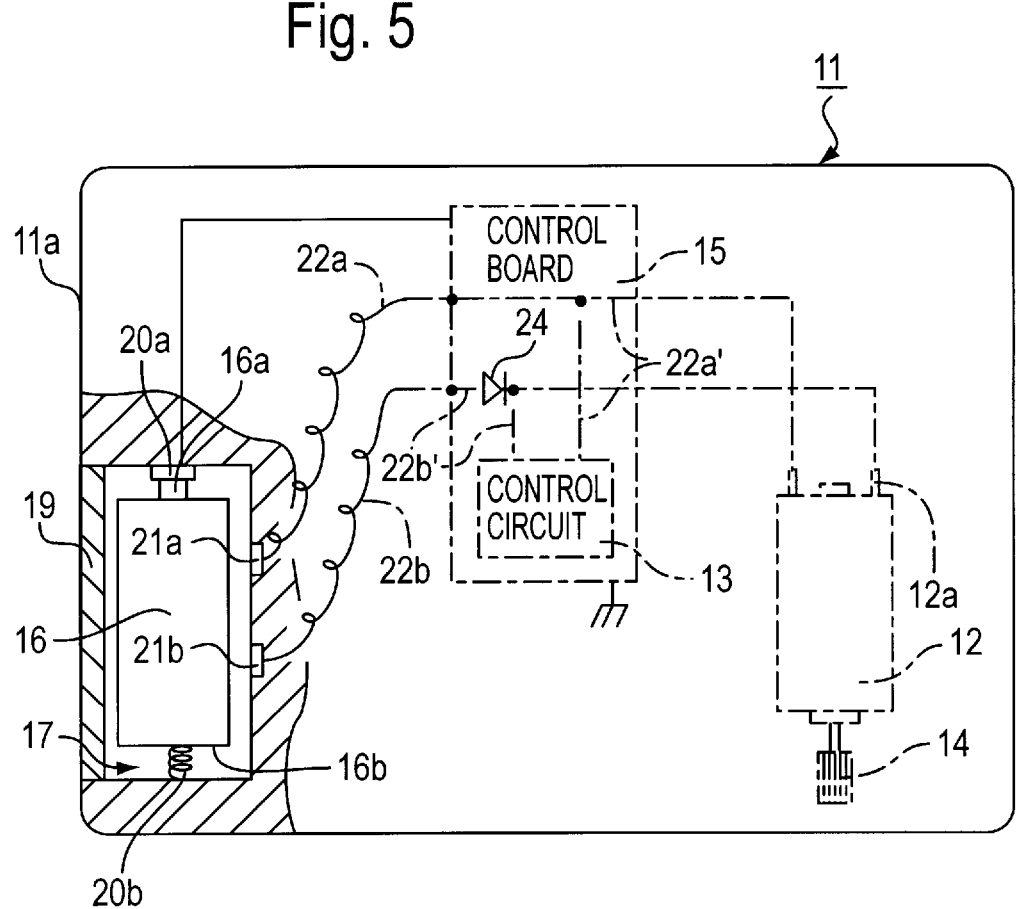

In FIG. 1, the positive and negative terminals 12a and 12b of the motor 12 are connected to the intermediate portions of the conductors 22a and 22b which connect the supplemental power supply terminals 21a and 21b and the control circuit 13. Alternatively, it is possible to connect the supplemental power supply terminals 21a, 21b and the motor 12 by means of the printed circuit patterns 22a' and 22b' of the control circuit board 15 which constitute a part of the conductors 22a and 22b, as shown in FIG. 5. In this alternative, the control circuit 13 is connected to the intermediate portions of the conductors 22a and 22b between the supplemental power supply terminals 21a, 21b and the motor 12.

A diode 24 is provided between the supplemental power supply terminal 21b (21b') and the positive (+) terminal 12a of the motor 12 to prevent the motor 12 from moving in the opposite direction (film winding direction) when the external power source 18 is reversely and mistakenly connected to the supplemental power supply terminals 21a (21a') and 21b (21b').

The forced-driving apparatus for a rewinding motor of a camera according to the present invention can be applied to a pre-winding type of camera in which the unexposed film is first unwound from the film cartridge and wound around the film winding spool, and then the unwound film is successively rewound into the film cartridge every time a frame of the film is exposed. In this application, a motor which is adapted to successively rewind the exposed film into the film cartridge corresponds to the motor 12 in the above-mentioned embodiment. Also, it is possible to apply the present invention to a camera incorporating the recently developed Advanced Photo System (APS).

As can be understood from the above discussion, in a forced-driving system for a film rewinding motor of a camera, according to the present invention, if control of the film rewinding motor is made impossible due to trouble with the control circuit, etc., the film can be easily removed from the camera without any problem.

What is claimed is:

1. A forced-driving apparatus for a motor of a camera which can rewind a film into a film cartridge comprising:

a battery compartment having electrodes which can connect to a battery for said camera; and supplemental power supply terminals, provided separate from said electrodes of said battery compartment, which can be connected to an external power source for supplying power to rotate said motor to rewind said film, wherein said supplemental supply power supply terminals are provided in said battery compartment.

2. A forced-driving apparatus according to claim 1, wherein said supplemental power supply terminals cannot connect to said external power supply when said battery is loaded in said battery compartment, and can connect to said external power supply when said battery is removed from said battery compartment.

3. A forced-driving apparatus for a motor of a camera, comprising:

a motor for rewinding a film into a film cartridge;

a battery for supplying power to said motor through a control circuit of said motor;

a battery compartment which can receive therein said battery; and supplemental power supply terminals, provided in said battery compartment, which are directly connected to said motor without passing through said control circuit, and can connect through an external power source from the outside of said camera to supply power to said motor.

4. A forced-driving apparatus according to claim 3, wherein said supplemental power supply terminals cannot connect to the outside when said battery is loaded in said battery compartment, and can connect to the outside when said battery is removed from said battery compartment.

5. The force-driving apparatus of claim 4, wherein said supplemental power supply terminals can connect to an external power source from the outside of said camera, to supply power to said motor when said control circuit of said motor is inoperative.

6. A force-driving apparatus for a motor of a camera, comprising:

a motor for rewinding a film into a film cartridge;

a battery for supplying power to said motor under control of a control circuit of said motor; and supplemental power supply terminals, which are connected to said motor without passing through said control circuit, to connect to a power source from outside of said camera, and to supply power to said motor when said control circuit is inoperative.

* * * * *